United States Patent [19]

Suzuki et al.

[11] 4,455,981

[45] Jun. 26, 1984

[54] METHOD AND SYSTEM FOR CONTROL OF AIR-FUEL RATIO

[75] Inventors: Atsushi Suzuki, Kariya; Yutaka Kawashima, Okazaki; Masakazu Ninomiya, Kariya, all of Japan

[73] Assignee: Nippondenso Co., Ltd., Kariya, Japan

[21] Appl. No.: 342,427

[22] Filed: Jan. 25, 1982

[30] Foreign Application Priority Data

Jan. 26, 1981 [JP] Japan .................................. 56-9836

[51] Int. Cl.³ ........................... F02B 3/08; F02B 32/00
[52] U.S. Cl. .................................... 123/438; 123/419; 123/436
[58] Field of Search ......................... 123/438, 436, 419

[56] References Cited

U.S. PATENT DOCUMENTS

| 4,026,251 | 5/1977 | Schweitzer et al. | 123/436 |
| 4,303,048 | 12/1981 | Nishio | 123/438 |
| 4,363,305 | 12/1982 | Ohgami et al. | 123/438 |
| 4,368,707 | 1/1983 | Leshner et al. | 123/436 |
| 4,377,143 | 3/1983 | Hamburg | 123/436 |

Primary Examiner—Raymond A. Nelli
Attorney, Agent, or Firm—Cushman, Darby & Cushman

[57] ABSTRACT

A system for controlling the air-fuel ratio in which the amount of fuel injected into the engine is controlled in accordance with the flow rate of air passing through an air intake pipe including a throttle valve for introducing the air into the engine and the engine operating conditions. A bypass of the air intake pipe is opened or closed to change the air-fuel ratio of the mixture to slightly richer and leaner sides of a basic air-fuel ratio, and the change of the engine output conditions based on the change of the air-fuel ratio is used to correct the air-fuel ratio in an optimum direction. On the basis of a parameter indicating the engine operating conditions such as the detection value of the intake pipe pressure, a control is made to introduce the air which passed through the bypass to one of the upstream or downstream portion of the throttle valve.

11 Claims, 12 Drawing Figures

↑ ENGINE SPEED

| Pm\Ne | --- | --- | r-2 | r-1 | r | r+1 | r+2 | --- | --- |
|---|---|---|---|---|---|---|---|---|---|
| --- | | | | | | | | | |
| --- | | | | | | | | | |
| p-1 | | | ΔT(p-1,r-2) | ΔT(p-1,r-1) | ΔT(p-1, r) | ΔT(p-1,r+1) | ΔT(p-1,r+2) | | |
| p | | | ΔT(p,r-2) | ΔT(p,r-1) | ΔT(p, r) | ΔT(p,r+1) | ΔT(p,r+2) | | |
| p+1 | | | ΔT(p+1,r-2) | ΔT(p+1,r-1) | ΔT(p+1,r) | ΔT(p+1,r+1) | ΔT(p+1,r+2) | | |
| --- | | | | | | | | | |
| --- | | | | | | | | | |

→ INTAKE PIPE PRESSURE

METHOD AND SYSTEM FOR CONTROL OF AIR-FUEL RATIO

BACKGROUND OF THE INVENTION

The present invention relates to a method of air-fuel ratio control in which the air-fuel ratio is controlled to a level where the fuel consumption rate is the most suitable under the normal running conditions, while the air-fuel ratio is controlled by feedback to a level associated with the highest output under the throttle valve condition of high degree of opening.

The air-fuel ratio of an internal combustion engine (hereinafter referred to as the engine) is set to a stoichiometric air-fuel ratio or a lean air-fuel ratio placing primary emphasis on the fuel consumption rate under normal running condition, At the time of acceleration or ascending a slope when the thorottle valve opens widely, on the other hand, the air-fuel ratio is set to about 13 associated with the highest output. When the engine is idling, the air-fuel ratio is set to a level taking the rotational stability of the engine, etc. into consideration.

First, description will be made of the air-fuel control under the normal running conditions for control of fuel consumption. The prior art carburator control is of open loop control type in which variations of different engines, secular change or change in lapse of time of an engine, and production variations of the carburetor have caused some loss of the fuel efficiency. In an electronic fuel injection system in which the amount of intake air into the engine is measured directly by an intake air amount sensor, the required quantity of fuel supply is computed by computer or the like and the fuel is supplied into the intake pipe by an electromagnetic valve according to the computation, and a closed loop control system is employed for determining the direction of the stoichiometric air-fuel ratio of about 15 on the basis of the output of an oxygen sensor provided in the exhaust pipe thereby to correct the amount of fuel supply. Also, a carburetor of closed loop control type finds applications in which the direction of the stoichiometric air-fuel ratio is determined by the output of the oxygen concentration sensor thereby to correct the air bleed quantity. These closed loop control systems, though effective in correcting the variations of air-fuel ratio, still cause a fuel loss due to the fact that the stoichiometric air-fuel ratio is not an air-fuel ratio of minimum fuel consumption.

A method of controlling the fuel consumption rate to the best level by eliminating these disadvantages is disclosed in U.S. Pat. No. 4,026,251. According to this patent, the air bypassing the carburetor is caused to dither, that is, switched at regular intervals of time between richer and leaner sides of air-fuel ratio, so that the direction of air-fuel ratio for improvement of fuel consumption rate is determined and the opening of an auxiliary air valve bypassing the carburetor is controlled accordingly thereby to correct the air-fuel ratio. In this device, the engine is operated once each at two points of reference air-fuel ratio provided on relatively rich and lean sides, and the engine speed $N_{eR}$ at the point of the rich air-fuel ratio is compared with the engine speed $N_{eL}$ at the point of lean air-fuel ratio. And if $N_{eR}$ is larger than $N_{eL}$ ($N_{eR} > N_{eL}$), the bypass air is reduced; while if $N_{eR}$ is smaller than $N_{eL}$ ($N_{eR} < N_{eL}$), the bypass air is increased.

In the case where a change of, say, the output of the engine is determined by the engine speed, however, it is impossible by this method to determine whether the change of the engine speed is caused by the change of the air-fuel ratio or by an external factor such as accelerator pedal operation, an ascending slope or descending slope etc., thus often resulting in the engine being controlled toward a deteriorated instead of improved fuel efficiency, in view of the fact that the engine speed depends on various factors. Also, the air-fuel ratio is corrected by changing the air amount bypassing the carburetor, so that an auxiliary air valve for changing the area with high accuracy is required but not yet commercially realized. Further, in spite of the fact that an air-fuel ratio for the highest output is required to be set at the time of acceleration or ascending the slope when the throttle valve widely opens, a method has not yet been realized in which the air-fuel ratio is controlled to become a value which causes the best fuel consumption rate under normal running conditions and to become a value which causes the highest output at the time of acceleration or ascending a slope.

SUMMARY OF THE INVENTION

Accordingly, it is an object of the present invention to provide a method and a system for control of the air-fuel ratio in which under normal operating conditions, the air not measured is supplied through a bypass into the intake pipe downstream of the throttle valve and the direction of change of air-fuel ratio which change causes improvement of fuel consumption is detected by the change of the engine speed which is made in synchronism with the bypass air, thus correcting the air-fuel ratio toward that direction by correction of the fuel supply quantity; while in the case where the acceleration or an ascending slope is detected in association with a widely opened throttle valve, on the other hand, the air not measured is supplied through a bypass to the intake pipe upstream of the throttle valve and the direction of change of air-fuel ratio which change causes an increased output is detected from the change of engine speed which is made in synchronism with the presence or absence of the bypass air, thus correcting the air-fuel ratio toward that direction by correcting the fuel supply quantity.

In an embodiment of the present invention, the automobile being accelerated or ascending a slope with the throttle valve wide open is detected by the fact that the intake pipe pressure exceeds a set value $P_1$.

According to the present invention, the air-fuel ratio is controlled automatically to a level for the minimum fuel consumption rate under normal operating conditions and to a level providing a high output when a high output is required. These two controls are made possible by the sole addition of a valve such as a three-way valve for switching the bypass air between the upstream and downstream portions of the throttle valve and by the use of an electronic circuit or a logic circuit for automatically controlling the air-fuel ratio to a level associated with the minimum fuel consumption rate.

Further, according to the method of automatically controlling the air-fuel ratio to a level which causes the minimum fuel consumption rate according to the present invention, the engine is operated alternately to provide at least two different air-fuel ratios in the vicinity of a desired air-fuel ratio by changing the bypass air quantity in the air flowmeter of an electronically-controlled fuel injection device for a predetermined period;

an engine speed signal, a torque signal or a signal representing the operating conditions related thereto which is generated by the engine operation at these air-fuel ratios is detected; and detection signals at four points for at least two air-fuel ratios are compared with each other thereby to decide whether the desired air-fuel ratio is located on rich or lean side of the air-fuel ratio for the best fuel consumption and to correct the desired air-fuel ratio in the direction of the best fuel consumption by correcting the injection quantity of the electronically-controlled fuel injection device.

In this way, according to the present invention, it is decided whether the engine speed is changed by an external factor such as accelerator pedal operation or by the change of the amount of bypass air. Further, since the air-fuel ratio is corrected by changing the amount of fuel injection, an auxiliary air vlave of high precision is not required. Also, the air-fuel ratio is corrected only by an electronic circuit or a logic circuit, thus reducing the cost of the system.

It will be seen from the foregoing description that the system according to the present invention is such that the air-fuel ratio is corrected automatically to a level for the best fuel consumption without error for an improved fuel efficiency while at the same time producing the largest output at the time of accelerator pedal operation when the throttle valve is widely open.

DESCRIPTION OF THE PREFERRED EMBODIMENTS

An embodiment of the present invention will be described below with reference to the accompanying drawings.

Figure 1A:
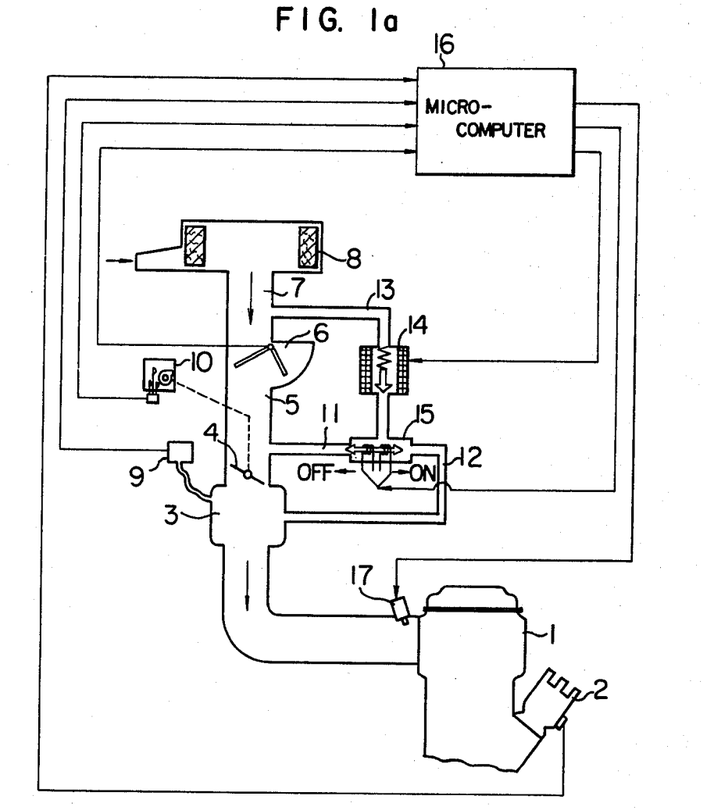
FIG. 1a is a schematic diagram showing a system for air-fuel ratio control of the internal combustion engine according to an embodiment of the present invention.

A first embodiment of the present invention is shown in FIG. 1a. Reference numeral 1 designates an internal combustion engine, numeral 2 a distributor including a rotational angle sensor or engine speed sensor as an integral part thereof, numeral 4 a throttle valve, numeral 3 a downstream portion of the throttle valve 4, and numeral 5 an upstream portion of the throttle valve 4. Numeral 6 designates an air flow meter for directly metering the air amount introduced into the engine 1. Upstream of this flow meter 6 is provided a duct 7, before which an air cleaner 8 is disposed. Numeral 9 designates a pressure sensor for detecting the pressure downstream of the throttle valve 4, and numeral 10 a throttle sensor for detecting the conditions such as idling of the engine 1 according to the opening of the throttle valve 4.

The air flow meter 6 connected with the duct 7 is bypassed by paths 13, 11 and 12 for introducing the air to the upstream portion 5 and the downstream portion 3 of the throttle valve 4. These paths contain an on-off electromagnetic valve 14 for controlling the interruption of air flow and a three-way valve 15 communicating with the upstream portion 7 of the air flow meter 6 and the upstream portion of the throttle valve 4 or the downstream portion 3 of the throttle valve 4. Numeral 16 designates a microcomputer for calculating the amount of fuel injection on the basis of detection signals from the air flow meter 6, the rotational angle sensor 2 and the pressure sensor 9 and supplying a fuel injection duration signal to the injector 17, which in turn injects the fuel into the engine in response to the fuel injection duration signal.

Figure 1B:
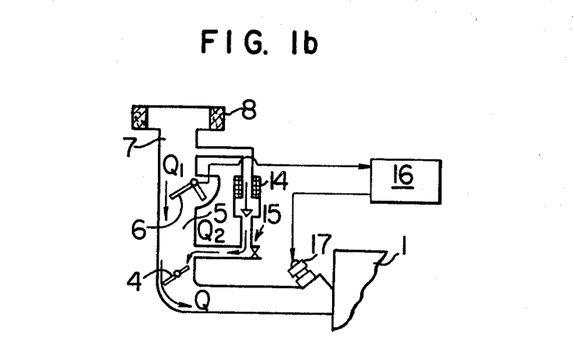
FIG. 1b is a diagram of a part of the system shown in FIG. 1a in which the bypass air is interrupted.

FIG. 1b shows a part of the system of FIG. 1a and is a diagram showing the condition under which the electromagnetic valve 14 is operated to interrupt the air to be supplied through the bypass to the upstream portion of the throttle valve 4 from the upstream portion of the air flow meter 6.

The computer 16 has a known construction. Since the computer 16 includes a superior processing feature for the purpose of effecting the control of air-fuel ratio according to the present invention, however, the detailed explanation of the operating circuit will be omitted and explanation will be made below about the operating processes with reference to flowcharts.

Figure 2A:
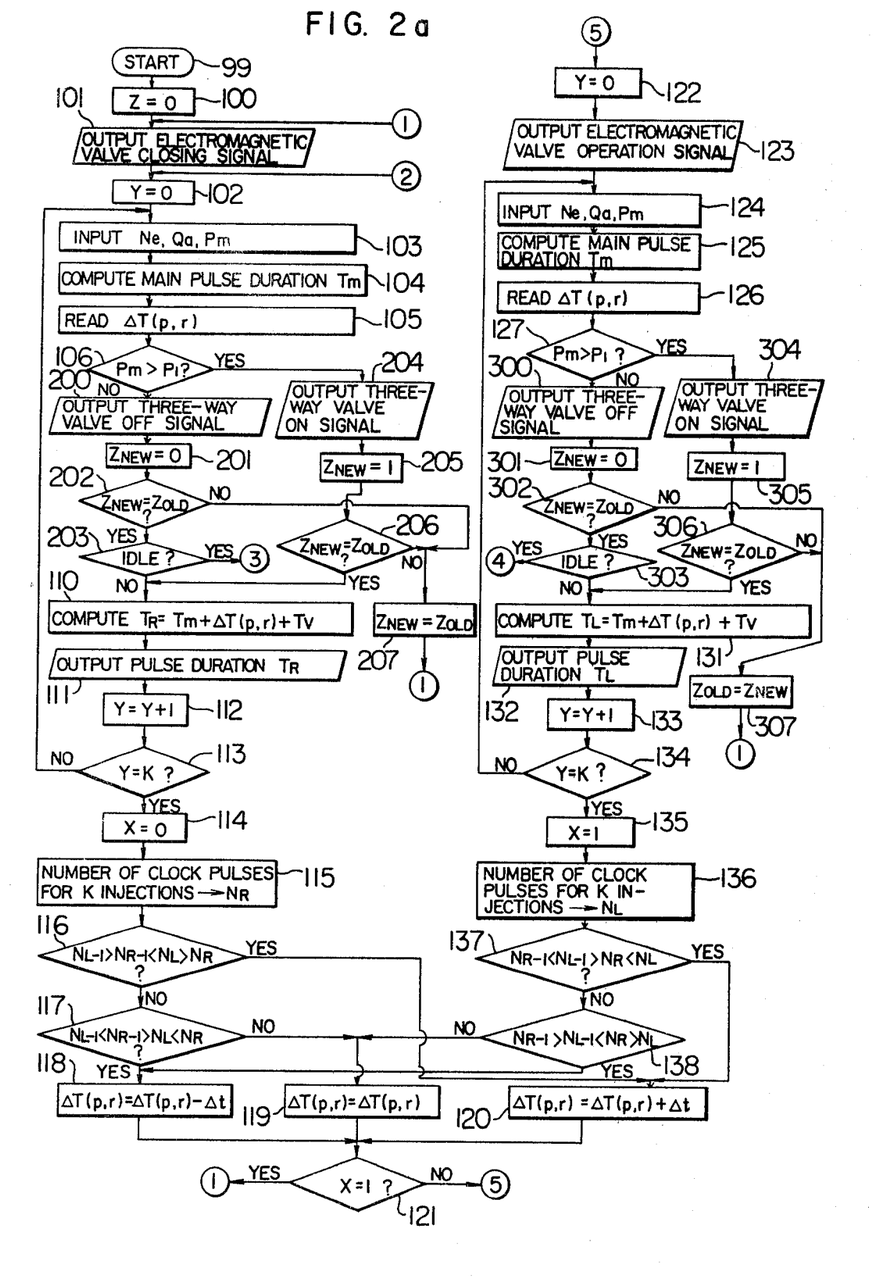
FIG. 2 is a flowchart showing the steps of operation in the computing circuit of the system of FIG. 1.
Figure 2B:
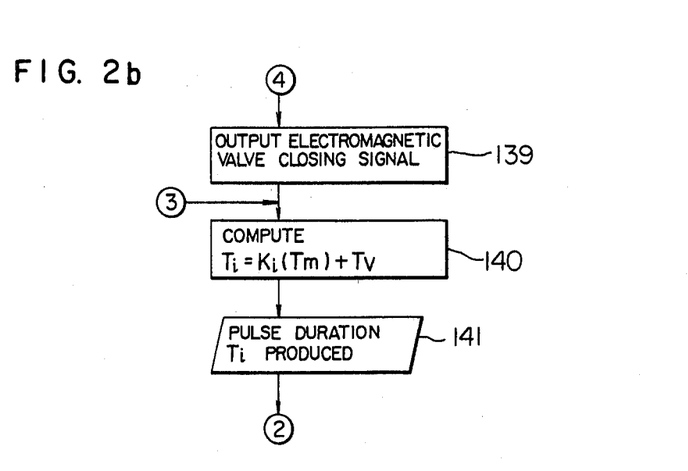
Figure 4:
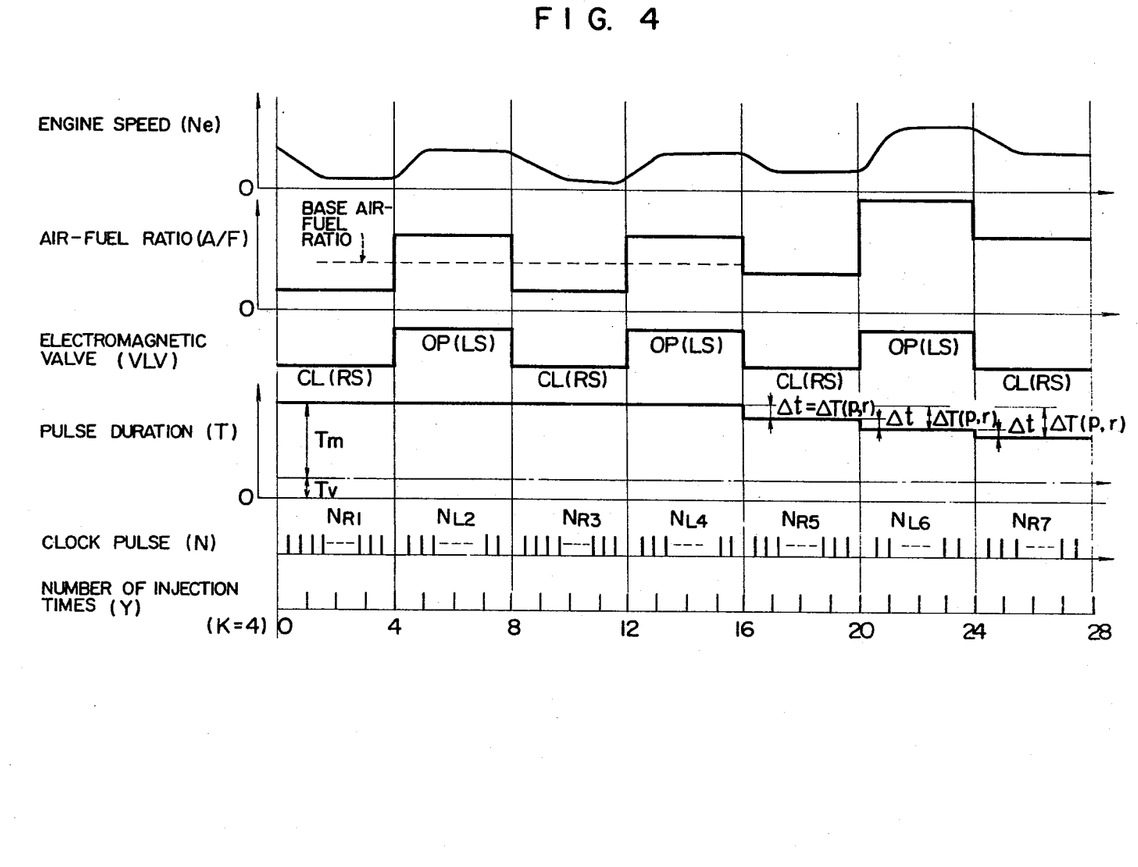
FIGS. 4 and 5 are waveform diagrams showing the processes of operation shown in the flowchart of FIG. 2.
Figure 5:
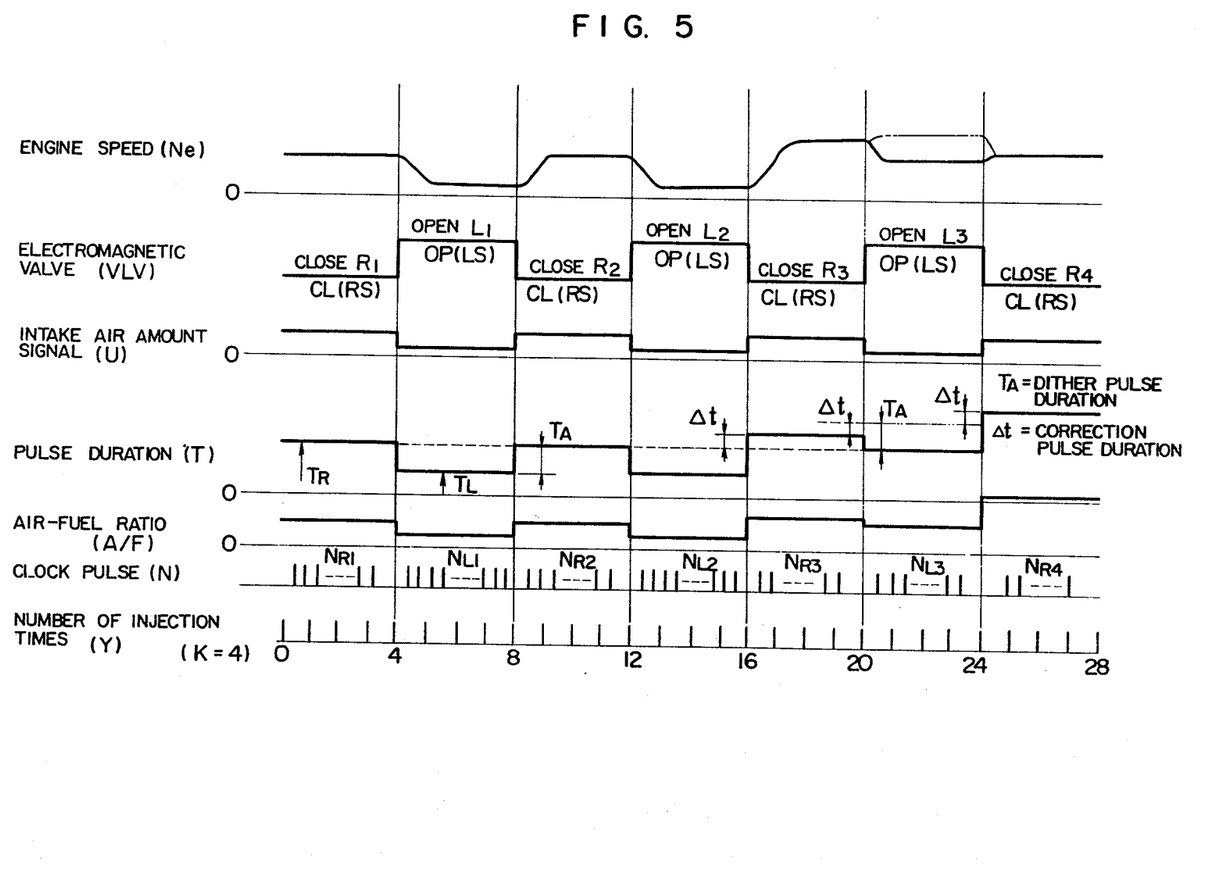

FIGS. 2a and 2b are flowcharts schematically showing the operating processes for control of the air-fuel ratio according to the present invention. FIGS. 4 and 5 are time charts for explaining the operation of the system used for control of the air-fuel ratio according to the present invention.

With the start of the engine, the control of air-fuel ratio according to the present invention begins from step 99. At step 100, Z=0 indicates the state in which the three-way valve 15 is on and moves rightward in FIG. 1a to close the right outlet thereof, where Z is an index representing the open or closed state of the three-way valve 15 at the time of fuel injection and is given as $Z_{NEW}$ for the present injection and $Z_{OLD}$ for the preceding injection. At step 101, a signal for closing the air path bypassing the air flow meter 6 is supplied to the electromagnetic valve 14. At step 102, the count of the index Y representing the number of fuel injections is set to zero (Y=0). At the next step 103, the value of the engine speed signal Ne, the value of the intake air amount signal $Q_a$ and the value of the intake pipe pressure signal $P_m$ are supplied from the rotational angle sensor 2, the air flow meter 6 and the pressure sensor 9.

At step 104, in response to these signals, the time length $T_m$ of the main pulse of a signal representing the required fuel supply amount, that is, the time of fuel supply to the injector 17 is computed.

Figure 3:
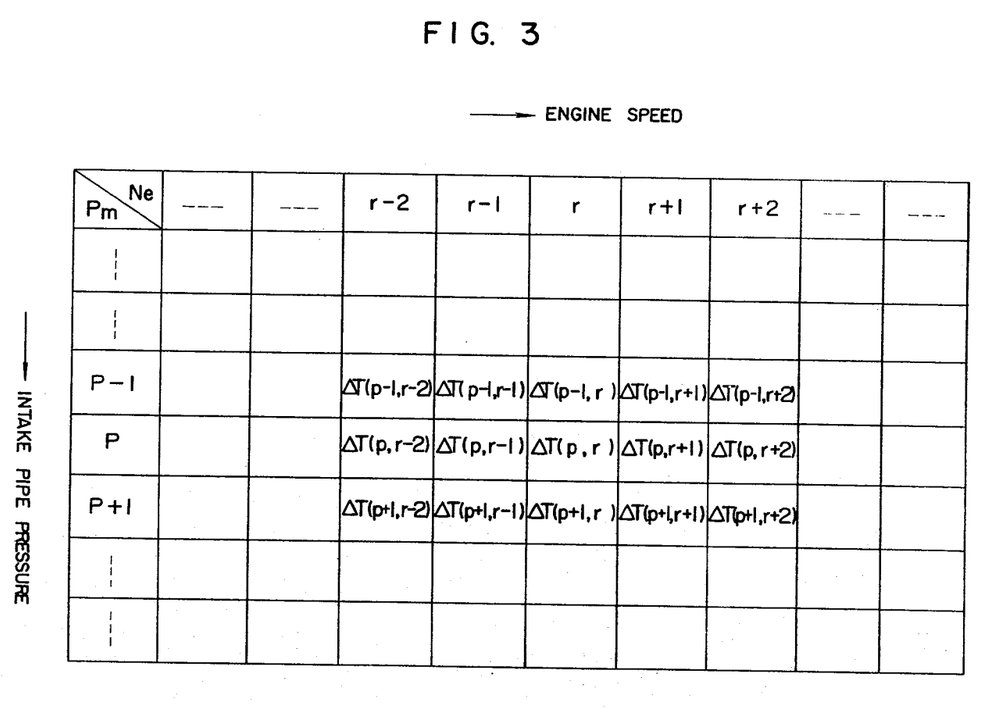
FIG. 3 is a diagram showing an example of the map in the memory of the microcomputer in the system of FIG. 1.

The map in the non-volatile memory in the microcomputer 16 of FIG. 1 is shown in FIG. 3 and is for storing the values of the engine speed signal Ne and the intake pipe pressure signal $P_m$ and the correction pulse duration $\Delta T(p, r)$ for the main pulse duration $T_m$ associated therewith.

Figure 10:
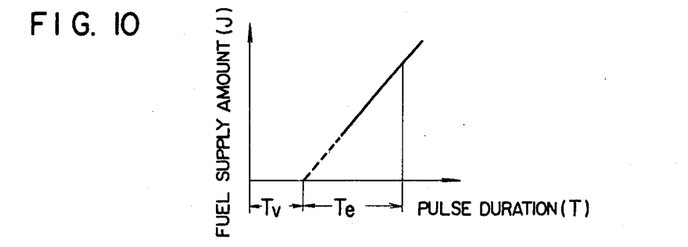
FIG. 10 is a characteristic diagram showing the relation between the energization pulse duration for opening the electromagnetic injection valve and the amount of fuel injection.

At step 105, the correction pulse duration $\Delta T(p, r)$ corresponding to the present engine speed signal Ne from the rotational angle sensor 2 and the intake pipe pressure signal $P_m$ from the pressure sensor 9 is read from the map in the memory shown in FIG. 3. At step 106, it is decided whether or not the intake pipe pressure $P_m$ exceeds the setting of $P_1$, which is set on the assumption of an output region required by the driver. If the intake pipe pressure $P_m$ exceeds $P_1$, the answer is "Yes" and the process is advanced to step 204 to apply an on signal to the three-way valve 15. When the three-way valve 15 is turned on, the upstream portion 7 of the air flowmeter 6 communicates with the upstream portion 5 of the throttle valve 4. Since the electromagnetic valve 14 is closed, however, no air flows. At step 106, if the value of the intake pipe pressure $P_m$ does not exceed the setting $P_1$, the answer is "No" and the process is passed to step 200. At step 200, an off signal is applied to the three-way valve 15 thereby to cause the upstream portion 7 of the air flow-meter 6 to communicate with the downstream portion 3 of the throttle valve 4. At step 201, Z is reduced to zero, and it is compared with the preceding value of Z at step 202. If it is equal to the preceding value, the process is passed to step 203, where it is decided whether or not the operating condition is idle. If it is idle, the idle contact of the throttle sensor 10 is turned on. In this case, the processing step is jumped to step 140, where in order to compute the pulse time duration required for the air-fuel ratio at the time of idling, the main pulse duration $T_m$ calculated at step 104 is multiplied by the correction factor $K_1$ and the product is added to the ineffective injection time $T_v$ of the injector 17. The relation between the pulse duration T and the amount of fuel injection J for the injector 7 which intermittently injects the fuel maintained at fixed pressure in accordance with the pulse duration is shown in FIG. 10. With the increase of the pulse duration T of the output produced from the computing circuit 16, the injection amount J of the injector 17 linearly increases. The pulse duration corresponding to the valve opening delay time of the injector is called the ineffective injection time and is expressed as $T_v$. The effective range of the pulse duration associated with the time of actual control of the injector is expressed as $T_e$. The pulse duration $T_i$ for idling is thus given as $T_i = K_1 \times T_m + T_v$.

At step 141, a pulse duration signal is applied to the injector 17, followed by the return to step 102. In other words, at the time of idling, as in the case where the intake pipe pressure $P_m$ exceeds $P_1$, the air-fuel ratio for the best fuel consumption is not determined nor corrected.

At step 203, if it is decided that idling is not involved, the process is passed to step 110, where in order to determine the final pulse duration the main pulse duration $T_m$ is added to the correction time duration $\Delta T(p, r)$ and the ineffective injection time $T_v$. After determining the final pulse duration $T_R$, an energization signal is applied to the injector 17 at step 111.

At step 112, the count Y of the number of injection time is incremented by one, followed by step 113 where the answer continues to be "No" and the loop from steps 103 to 113 is followed until the number of injection times reaches the setting K. In this embodiment, K is set to 4 as shown in the lower left part of FIGS. 4 and 5. When the number of injection times coincides with the setting K, the answer changes to "Yes" and at step 114, X is set to zero. When the index X is zero (X=0), it indicates the operation of the rich step with the electromagnetic valve 14 closed, while the index X of 1 (X=1) indicates the operation of the lean step with the electromagnetic valve 14 open. At step 115, the count $N_R$ of the clock pulses of predetermined frequency supplied from a clock pulse generator during the time in which K times of injections are made, namely, the value of rotational period (rotational time) of the engine during the K injections is stored in the memory. The number of clock pulses and the engine speed are so related to each other that with the increase in engine speed, the period in which K times of injections are made is shortened and therefore the count of the clock pulses during that particular time period is reduced.

This will be explained with reference to the time chart showing the lapse of time in FIG. 4. FIG. 4 shows a signal Ne representing the engine speed, a signal A/F representing the air-fuel ratio, a signal VLV representing the open or closed state of the electromagnetic bypass air valve 14, a pulse time duration signal T, a clock pulse signal N, and a signal Y representing the number of fuel injection times. The dashed line depicted with the air-fuel ratio signal A/F denotes a basic air-fuel ratio. When the electromagnetic bypass air valve 14 is closed (CL), the rich cycle (RS) is involved; while when the valve 14 is open (OP), the lean cycle (LS) is involved.

Figure 6:
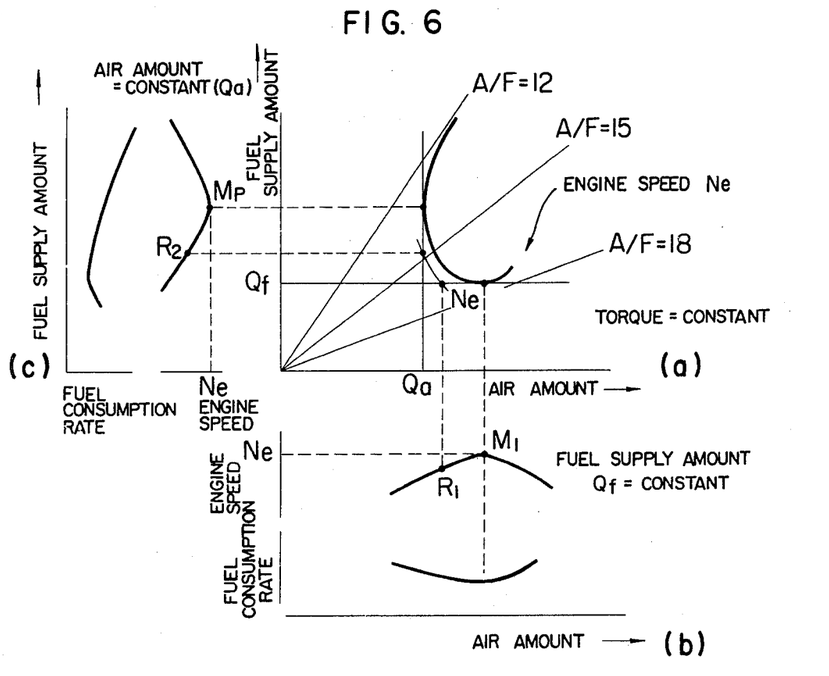
FIG. 6 is a characteristic diagram showing the relation between the fuel supply amount, the rotational speed of the internal combustion engine and the amount of air.
Figure 7:
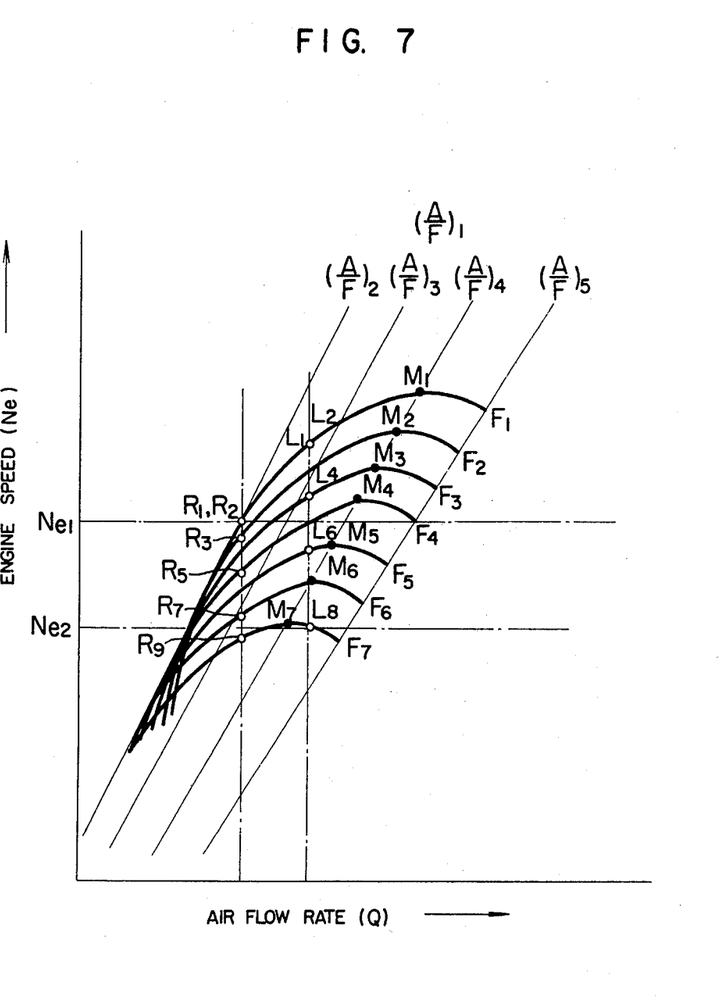
FIG. 7 is a characteristic diagram showing the relation between the air flow rate and the rotational speed of the internal combustion engine.

In this case, on the assumption that the axial torque of the engine is fixed, the relation between the fuel flow rate $Q_f$, engine speed and the air flow rate $Q_a$ is shown in FIG. 6a. Characters Ne and Ne' show curves of equal engine speed. With the fuel flow rate fixed at $Q_f$, the relation between the engine speed, fuel consumption and the air amount is shown in FIG. 6b. The values of engine speed $M_1$ and $R_1$ shown in FIG. 6b are equal to Ne and Ne' in FIG. 6a. In FIG. 7, the curves $F_1, F_2, \ldots, F_7$ ($F_1 > F_2 > F_3 > \ldots > F_7$) represent the change of engine speed caused when the air flow rate is changed with the fuel flow rate (fuel supply amount) F as a parameter. The straight lines A/F ($(A/F)_1$; $(A/F)_2$; $\ldots$, $(A/F)_5$) represent the engine speed for equal air-fuel ratio with respect to the change of the amount of the mixture gas. Generally, the air-fuel ratio $(A/F)_2$ for the highest rate of increase of engine speed with the amount of the mixture gas fixed is about 13. The points M ($M_1, M_2, \ldots, M_7$) where the engine speed increases most with the fuel flow rate as a parameter is located on the line $(A/F)_4$. At this point, the fuel consumption rate for each fuel flow rate assumes the best value. It is the intention of this invention to attain the automatic control to reach the point M.

Assume, for instance, that the automobile is run at the engine speed of $N_{e1}$. If the initial condition is located at point $R_1$ on the fuel flow rate line $F_1$, the best fuel consumption rate is attained by driving the automobile at the air-fuel ratio between the points $M_4$ and $M_5$, namely, between curves $F_4$ and $F_5$ of fuel flow rate where the same engine speed is obtained. At step 106, if the intake pipe pressure $P_m$ exceeds the value $P_1$, an output is produced to turn on the three-way valve 15 at step 204, followed by step 205 where Z is made 1. At step 206, this value of Z is compared with the preceding value thereof. If the preceding value of Z is zero, namely, if the step 204 is not taken in the preceding operation in the loop from steps 103 to 113 but taken for the first time in the present process, the answer "No" is produced at step 206, so that the process is passed to step 207 and the preceding value of Z is replaced by 1, that is, the same value as the present one. Now the process is returned to step 101, from which the number of injections is counted.

In the case where the preceding value of Z is determined to be 1 at step 206, i.e., in the case where the preceding injection has been effected and the processing steps starting from step 204 have been passed, the process is passed to "Yes" branch from step 206 to step 110, where the pulse time duration is calculated while the number of injection times continues to be counted. If the value of Z is determined to be different at step 202, on the other hand, the answer is "No" and therefore the process is passed to step 207.

In the flowchart of FIG. 2, the process is advanced to steps 116 and 117, where the past four rotational periods $N_{L-1}$, $N_{R-1}$, $N_L$ and $N_R$ including the rotational period $N_R$ for the present rich step are compared with each other. $N_R$ designates the present rich step, $N_L$ the preceding lean step, $N_{R-1}$ a further preceding rich step, and $N_{L-1}$ a still further preceding lean step.

As the result of the comparison between these four rotational periods of the engine, it is decided whether or not the relation $N_{L-1} > N_{R-1} < N_L > N_R$ is established at step 116. If it is established, the answer is "Yes" so that, in view of the fact that the engine speed indicates that in view of the fact that the engine speed increases at the rich step and decreases at the lean step, to increase the fuel quantity increases the engine speed for an improved fuel efficiency.

At steps 118 and 120, the pulse duration correction $\Delta T(p, r)$ is computed. The correction pulse duration $\Delta T(p, r)$ corresponding to the present engine speed Ne and the intake pipe pressure $P_m$ is read from the corresponding address of the map formed in the non-volatile memory region of the computing circuit, the increment $\Delta t$ is added or subtracted, and the value $\Delta T(p, r)$ modified or corrected by this computation is written in the corresponding address of the memory.

If the relation $N_{L-1} > N_{R-1} < N_L > N_R$ is not established at step 116, the process is passed to step 117. This concerns the case in which the engine is operated at an air-fuel ratio richer than the air-fuel ratio at point M for the best fuel consumption. Since $N_{L-1} < N_{R-1} > N_L < N_R$, the answer at step 117 is "Yes", followed by step 118 where $\Delta t$ is subtracted from the correction $\Delta T(p, r)$ in the memory associated with the particular operating condition. In other words, the injection amount equivalent to $\Delta t$ in pulse duration is reduced thereby to approach the optimum fuel supply quantity.

In the event that the relation $N_{L-1} > R_{R-1} < N_L > N_R$ or $N_{L-1} < N_{R-1} > N_L < N_R$ is not established, the process is passed to step 119 without correcting the value $\Delta T(p, r)$. When the operating conditions of the internal combustion engine change at the transient period thereof such as at the time of acceleration by depression of the accelerator pedal, the change of engine speed due to acceleration is far greater than the change of engine speed caused by changing the air-fuel ratio by a slight change of the air quantity at rich and lean steps, resulting in the gradual increase in engine speed. Thus the relation of rotational periods $N_{L-1} > N_{R-1} > N_L > N_R$ is established, so that the conditions at step 116 or 117 are not satisfied, with the result that the process is passed to step 119 without correcting the value $\Delta T(p, r)$. Also when the air-fuel ratio for the optimum fuel consumption rate is involved, the relation $N_{L-1} = N_{R-1} = N_L = N_R$ is obtained, so that no correction is made but the optimum injection amount is maintained.

Upon completion of step 118, 119 or 120, the process is advanced to step 121, where it is decided whether the present step is the rich step (X=0) or the lean step (X=1). If the rich step (X=0) is involved, the answer is "No" followed by step 122, while if the lean step (X=1) is involved, the answer is "Yes" followed by step 101. As mentioned above, upon completion of the step with the electromagnetic valve 14 closed, the answer is "No" so that the process is advanced to step 122. At step 122, the number of injection times Y is set to zero. Since the lean step is presently involved, i.e., X=1, the electromagnetic bypass air valve 14 is opened.

At steps 124 to 126, the same computation is made as at steps 103 to 105. At step 127, it is decided whether or not the value of the intake pipe pressure $P_m$ exceeds the set pressure $P_1$ as at step 106, and if the value $P_1$ is exceeded, the answer is "Yes" followed by step 304. At step 304, an on output is produced to the three-way valve 15, with the result that the upstream portion 7 of the air flowmeter 6 communicates with the upstream portion 5 of the throttle valve 4 and the air bypassing the air flowmeter 6 is applied to the upstream portion 5 of the throttle valve 4. Since a fixed amount of air is passed through the throttle valve 4, the fact that the bypass air is applied to the upstream portion 5 of the throttle valve 4 reduces the amount of air flowing in the air flowmeter 6. The air flowmeter 6 applies a low air amount signal to the microcomputer 16, which data is used for computation of the fuel supply amount. To apply the bypass air to the upstream portion 5 of the throttle valve 4 is to reduce the amount of fuel injection.

This process will be explained with reference to the diagram of FIG. 5. FIG. 5 shows the engine speed signal $N_{e1}$, electromagnetic bypass air valve operating condition signal VLV, intake air amount signal U, pulse time duration signal T, air-fuel ratio signal A/F, clock pulse signal N and the number-of-injection-times signal Y. When the electromagnetic bypass air valve is closed (CL), the rich cycle (RS) is involved, while when the valve is open, (OP), the lean cycle (LS) is involved. The relation between fuel supply amount, engine speed and the fuel consumption rate with the air amount fixed to a certain value is shown in FIG. 6c. The above mentioned operating condition with the fixed air amount is located at point $R_2$ on the fuel supply amount curve, and it is an object of the present invention to effect automatic control to reach the point $M_p$ of maximum output or the highest engine speed for the particular air amount when the intake pipe pressure $P_m$ exceeds $P_1$ and the throttle valve 4 is almost full open.

At step 127, if the value of intake pipe pressure $P_m$ is not higher than $P_1$, the answer is "No" followed by step 300 where an off signal is applied to the three-way valve 15. Then the upstream portion 7 of the air flowmeter 6 communicates with the downstream portion 3 of the throttle valve 4 and the air flows therebetween. At step 301, the value of Z is set to zero. At step 302, this value is compared with the preceding value of Z, and if they are equal to each other, the process is passed to step 303. At step 303, it is decided whether or not the throttle valve 4 is closed up, and if it is closed up, the answer is "Yes" so that the process is advanced to step 139. At step 139, the electromagnetic bypass air valve 14 is closed, and at step 140, the pulse time duration $T_i$ of the idle air-fuel ratio is calculated, followed by step 141, where the pulse time duration signal is applied to the injector 17, followed by step 102 where the control procedures are taken from the beginning.

At step 303, if the throttle valve 4 is not closed up, the answer is "No" followed by step 131. At steps 131 to 133, the same calculation is made as at steps 110 to 112. At step 134, it is decided whether or not the number of injection times Y has reached the set number of injection times K, and if it has not yet reached the set number of injection times, the "No" branch is taken so that the calculations in the loop from steps 124 to 134 are made. At step 127, if the answer is "Yes" since the intake pipe pressure $P_m$ exceeds the set pressure $P_1$, step 304 is taken and the same calculation is made at steps 304 to 306 as at steps 204 to 206. At step 306, the present value of Z is compared with the preceding value thereof, and if they are equal to each other, the answer is "Yes" followed by step 131. If the answer is "No", i.e., the present value of Z is not equal to the preceding value thereof, the "No" branch is taken to advance to step 307 where the preceding value of Z is made the same as the present value thereof. Then the process is passed to step 101. At step 134, when the number of injection times reaches K, the answer is "Yes" followed by step 135 where in order to secure that the present step is a lean one, X is set to 1. At step 136, as at step 115, the rotational period $N_L$ of the lean step is stored in the memory.

At step 137, if the relation $N_{R-1} < N_{L-1} > N_R < N_L$ is established, the process is passed to step 120, where the value $\Delta t$ is added to the correction $\Delta T(p, r)$ and the sum is stored. At step 137, if the relation $N_{R-1} < N_{L-1} > N_R < N_L$ is not established, on the other hand, the answer is "No" followed by step 138, where it is decided whether or not the relation $N_{R-1} > N_{L-1} < N_R > N_L$ is established. If this relation is obtained, the answer at step 138 is "Yes", and the process is advanced to step 118, where the value $\Delta t$ is subtracted from the correction $\Delta T(p, r)$ with the difference being stored. Unless this relation is established, on the other hand, the process is passed through the "No" branch to step 119 without modifying the correction $\Delta T(p, r)$.

Upon completion of step 118, 109 or 120, the process is passed to step 121, where it is decided whether or not the lean step is presently involved. Since the steps 122 to 136 involve a lean step (X=1) for the present calculation, the answer is "Yes" followed by step 101.

The above-mentioned control permits the correction of any displacement of the air-fuel ratio from that for the best fuel consumption rate when the intake pipe pressure $P_m$ is not higher than the set value $P_1$, thus controlling the air-fuel ratio to the value for the best fuel consumption rate. In the case where a high output is desired (when the intake pipe pressure $P_m$ is higher than the set value $P_1$), on the other hand, any displacement from the air-fuel ratio for the maximum output is corrected thereby to control the air-fuel ratio to a value for the maximum output.

With reference to the characteristic diagram of FIG. 7, explanation will be made of the case in which the intake pipe pressure $P_m$ is not higher than the set value $P_1$ in the relation between the above-mentioned computation process and the actual car operation. The characteristic curve of FIG. 7 is the same as the characteristic curve at upper part of FIG. 6b, and shows the relation between the air flow rate and engine speed with the fuel flow rate fixed to $F_1$ to $F_7$ as a parameter. The first rich step is $R_1$, followed by the lean step $L_1$ involving the fuel flow rate for which the best fuel consumption rate is located at point $M_1$. The lean step $L_1$ is followed by rich step $R_2$, further followed by lean step $L_2$. After the control up to the lean step $L_2$, as to the decision whether $N_{R-1} > N_{L-1} < N_R > N_L$, the relation $N_{R1} > N_{L1} < N_{R2} > N_{L2}$ is established at step 138 of FIG. 2, followed by step 118 where the value $\Delta t$ is subtracted in pulse duration, so that the fuel flow rate is reduced and line $F_1$ is transferred to line $F_2$ ($F_1 > F_2$), resulting in the operation at point $R_3$. After completion of the operation at point $R_3$, at step 117, the relation $N_{L1} < N_{R2} > N_{L2} < N_{R3}$ is similarly established followed by step 118 where the pulse duration is reduced by $\Delta t$, so that the line $F_2$ is changed to line $F_3$ ($F_2 > F_3$). Subsequently, a similar correction is made, and when the operation comes to be effected at point $L_8$ on the curve $F_7$, the relation $N_{R5} > N_{L6} < N_{R7} < N_{L8}$ is established at step 138, where the answer is "No" followed by step 119. Thus the fuel line is not corrected after $F_7$.

The foregoing description concerns the case in which the air-fuel ratio is controlled to a value for the best fuel consumption when the intake pipe pressure $P_m$ is not higher than the set value $P_1$. Now, explanation will be made of the case in which the air-fuel ratio is controlled to a value for the maximum output when the intake pipe pressure $P_m$ is larger than the set value $P_1$, with reference to the characteristic diagram of FIG. 8. The characteristic curve of FIG. 8 is the same as the characteristic curve on the right side of FIG. 6c, where the air quantity is fixed at $Q_a'$.

Figure 8:
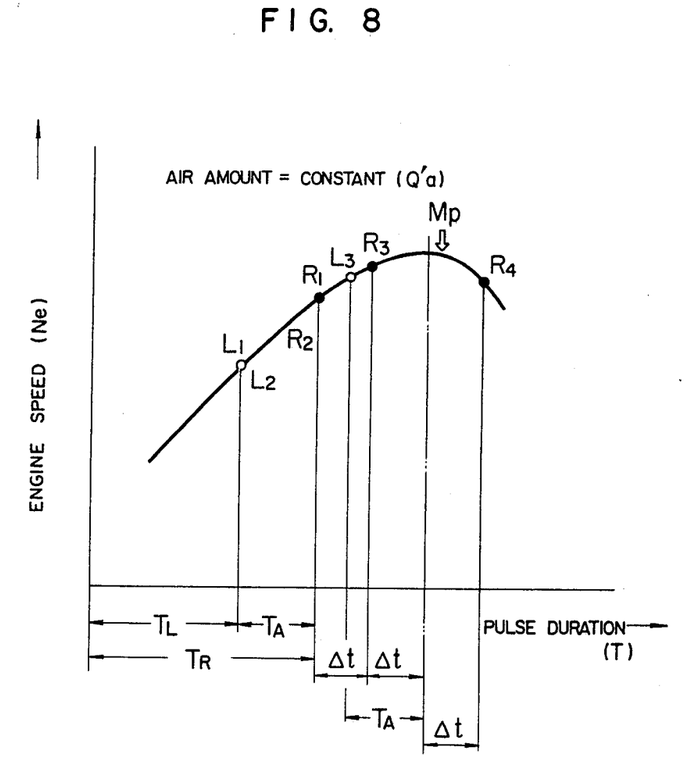
FIG. 8 is a characteristic diagram showing the relation between the amount of fuel supply and the rotational speed of the internal combustion engine.

The characteristic curve of FIG. 8 shows the relation between the fuel supply amount and the engine speed for explaining the processes of feed back control to the maximum output point. In this case, the three-way valve 15 is turned on and the bypass air path is as shown in FIG. 1b.

The bypass air is caused to bypass the air flowmeter 6 up to the upstream portion of the throttle valve 4. When the electromagnetic valve 14 is closed, the air amount Q passing through the throttle valve 4 is equal to the air amount $Q_1$ passing through the air flowmeter, so that the injector 17 injects the fuel corresponding to Q (=$Q_1$). The pulse duration associated with this situation is assumed to be $T_R$. When the electromagnetic valve 14 is open, the air amount passing through the throttle valve 4 is Q and the same as when the electromagnetic valve 14 is closed, in which case, due to the bypass air amount $Q_2$, the air amount $Q_1$ passing through the air flowmeter 6 is reduced to Q-$Q_2$ with the result that the injector 17 injects the fuel corresponding to Q-$Q_2$. The pulse time duration associated with this condition is assumed to be $T_L$.

As mentioned above, the bypass air of the air flowmeter 6 is applied to the upstream portion 5 of the throttle valve 4 thereby to dither the air-fuel ratio so that the fuel amount is changed by the pulse duration of $T_A (= T_R - T_L)$.

This will be explained with reference to FIG. 8.

In the control of fuel supply amount in FIG. 8, the closed state of the electromagnetic valve 14 is shown as $R_1$ and the pulse duration at that time as $T_R$. As shown in FIG. 5, while four injections are made during the period of $R_1$ (for the rich cycle when the electromagnetic valve 4 is closed), the clock pulses of $N_{R1}$ are produced. It was also explained that the relation between the engine speed Ne and the number of clock pulses is such that with the increase in Ne, the period of four injections is shortened for a smaller number of clock pulses N. When the electromagnetic valve 4 is opened, the intake air amount signal of the air flowmeter 6 is reduced thereby to reduce the pulse duration to $T_L$. This state is expressed by $L_1$. In FIG. 5, the number of clock pulses during the openings of the electromagnetic valve 14, namely, during the period $L_1$ is measured to be $N_{L1}$.

As a result, as shown in FIG. 8, the fuel supply amount is dithered at $T_A$ (by converting into the pulse duration).

The number of clock pulses in the cycle $R_2$ (same as in the cycle $R_1$) during which the electromagnetic valve 14 is closed is $N_{R2}$, and the number of clock pulses in the cycle $L_2$ (same as in the cycle $L_1$) during which the electromagnetic valve 14 is open is $N_{L2}$.

The four cycles $R_1$, $L_1$, $R_2$ and $L_2$ are completed and the number of clock pulses for each cycle is thus determined. For the purpose of comparison between the present cycle $N_{L2}$ and the past three cycles of $N_{R2}$, $N_{L1}$ and $N_{R1}$, the number of clock pulses is required to be stored. For this purpose, the engine speed for each cycle is compared finally. If $N_{R1} < N_{L1} > N_{R2} < N_{L2}$, it indicates that there is a point where the engine speed increases to richer side. In that case, the pulse duration $\Delta t$ is added to the pulse duration for the closed electromagnetic valve 14 as shown in FIGS. 5 and 8. And the number of clock pulses for the period $R_3$ of correction is $N_{R3}$.

As in the preceding case, the number of clock pulses for the present cycle $N_{R3}$ and the past three cycles $N_{L2}$, $N_{R2}$ and $N_{L2}$ is compared with each other. In this case, $N_{L1} > N_{R2} < N_{L2} > N_{R3}$ and therefore the pulse duration of $\Delta t$ is further added.

In FIG. 5, the control is made to the position of the two-dot chain in FIG. 8 during the period of $L_3$ (20th to 24th injections). In fact, $L_3$ indicates the lean cycle when the electromagnetic valve 14 is open (when the output of the air flowmeter is reduced), so that the fuel is injected for the pulse duration shown by solid line.

The number of clock pulses between the present one $N_{L3}$ for the period $L_3$ and numbers of clock pulses in the past $N_{R3}$, $N_{L2}$ and $N_{R2}$ is compared. The result of comparison is that $N_{R2} < N_{L2} > N_{R3} < N_{L3}$. This indicates that the engine speed is increased as the air-fuel ratio is made richer, so that the pulse duration of $\Delta t$ is added at $R_4$.

The condition for the period $R_4$ is shown in FIGS. 5 and 8. The result of comparison of clock pulses is that $N_{L2} > N_{R3} < N_{L3} < N_{R4}$ and therefore no correction is made.

Through the above-mentioned processes, the control is made to attain the maximum output point $M_P$. The amount of correction is stored for each operating condition in the memory of the microcomputer, thus making possible the operation always under the optimum condition.

In the embodiment of FIG. 2, the same control is attained even if the decision is divided into $N_{L-1} > N_{R-1}$ and $N_L > N_R$ at step 116, into $N_{L-1} < N_{R-1}$ and $N_L < N_R$ at step 117, into $N_{R-1} < N_{L-1}$ and $N_R < N_L$ at step 137, and into $N_{R-1} > N_{L-1}$ and $N_R > N_L$ at step 138.

In the aforementioned first embodiment, the air flow rate is controlled by a common electromagnetic valve 14 and the three-way valve 15 is used for switching the air supply path. As an alternative method, the air path 13 from the upstream portion 7 of the air flowmeter 6 may be divided into two branches which communicate with the upstream portion 5 and the downstream portion 3 of the throttle valve through the electromagnetic valves 14-1 and 14-2 respectively having the dual functions of switching the air supply path and controlling the air flow rate to attain the same purpose of control.

Further, the valves of electromagnetic type used for switching the air supply path and controlling the air flow rate in the aforementioned embodiment of the present invention may be replaced with equal effect by a construction using driving means such as pressure control or stop motor in order to effect the same control.

Furthermore, although the switching operation of the outlet of the bypass air depends on the magnitude of the intake pipe pressure $P_m$ as relative to the set valve $P_1$, the opening signal for the throttle valve 4, the pulse time duration signal or other signals may be used for the same purpose.

Figure 9:
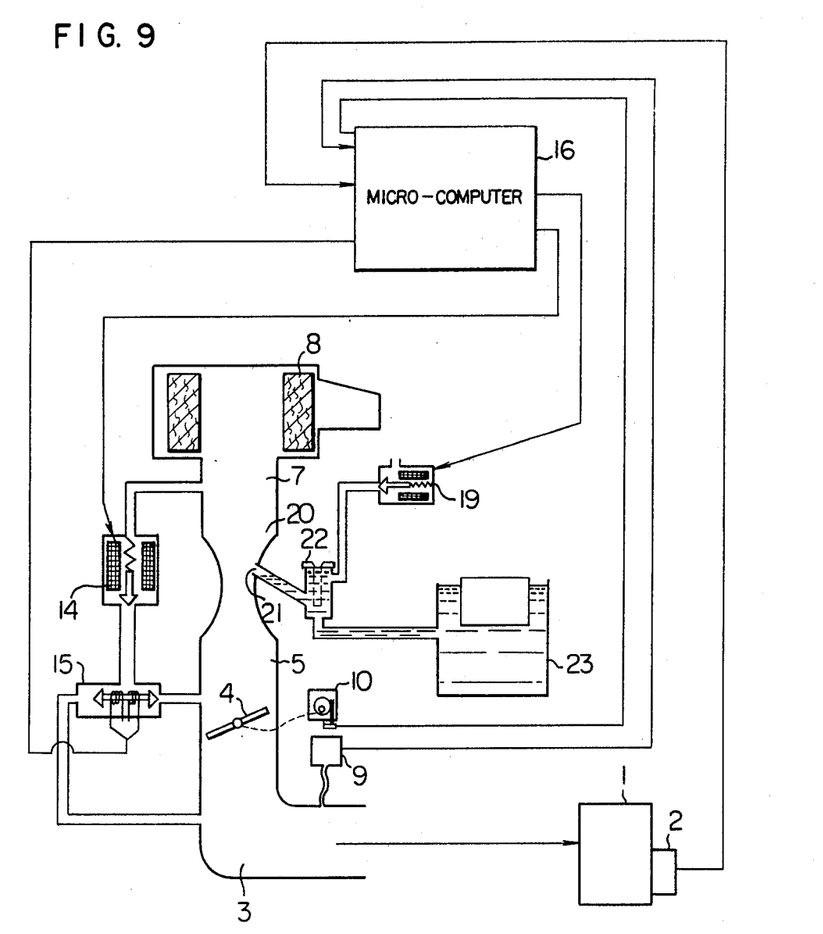
FIG. 9 is a schematic diagram showing the air-fuel ratio control system of the internal combustion engine used for control of the air-fuel ratio of the internal combustion engine according to another embodiment of the present invention.

FIG. 9 is a schematic diagram showing another embodiment of the method of the present invention applied to the control of the internal combustion engine using a carburetor. The difference of this embodiment from the first embodiment will be described. In FIG. 9, fuel is supplied from the main nozzle 21 provided at the venturi portion 20 of the carburetor. The electromagnetic valve 19 is provided to introduce air to the air bleed chamber 22 disposed midway of the fuel conduit between the float chamber 23 for fuel storage and the main nozzle 21. The bypass air path communicates with the upstream portion 5 and the downstream portion 3 of the throttle valve 4, bypassing the main nozzle 21 of the carburetor. The computer 16 operates the electromagnetic bypass air valve 14 thereby to control the flow rate of the bypass air as in the first embodiment. The fuel supply amount is corrected by changing the duty factor of the energization signal of predetermined frequency supplied to the electromagnetic valve 19 for controlling the air bleed amount.

We claim:

1. In a method of controlling the air-fuel ratio comprising an air intake pipe for introducing air into an engine, a throttle valve provided in said air intake pipe, and fuel supply means for metering the intake air flow, detecting the operating conditions of the engine and supplying the fuel in accordance with the metered air flow and the engine operating conditions, said method including the steps of changing the air-fuel ratio alternately to slightly richer and leaner sides of a base air-fuel ratio, operating the engine with mixture of said changed air-fuel ratio, detecting the resulting change of the output condition of said engine, determining the direction of change of the optimum air-fuel ratio from the result of said detection, and correcting said base air-fuel ratio in said direction thus determined; the improvement of said method comprising steps of introducing auxiliary air not metered by said fuel supply means into said air intake pipe, determining whether to introduce said auxiliary air to the upstream portion of said throttle valve or to the downstream portion of said throttle valve on the basis of the result of said detection of the engine operating conditions, introducing said auxiliary air to the position based on said result of decision, and changing the base air-fuel ratio alternately to the slightly richer and leaner sides with said auxiliary air.

2. A method according to Claim 1, wherein said output condition of the engine is represented by at least one of the engine speed signal and the torque signal of said engine.

3. A system for controlling the air-fuel ratio comprising;
 an air intake pipe for introducing the air into an engine,
 a throttle valve provided in said air intake pipe,
 an air flowmeter disposed upstream of said throttle valve in said air intake pipe,
 a bypass from the upstream portion to the downstream portion of said air flowmeter for the air flowing in said air intake pipe, said bypass including an on-off valve for controlling the air flowing in said bypass and a change-over valve for switching the air passed through said on-off valve to selected one of the upstream portion and the downstream portion of said throttle valve,
 a fuel injector provided at the connection between said air intake pipe and said engine,
 means for detecting the engine operating conditions, and
 a computer for controlling the amount of fuel injected by said fuel injection valve according to the output of said air flowmeter and the output of said means for detecting the engine operating conditions, said computer turning on and off said on-off valve for each predetermined number of fuel injection times thereby to change the air-fuel ratio alternately to slightly richer and leaner sides of a base air-fuel ratio, detecting the change of the output condition of said engine in accordance with the change of the air-fuel ratio, determining the direction of change of the optimum air-fuel ratio from said result of detection, controlling the air-fuel ratio in the direction based on said result of determination, and controlling said change-over valve in accordance with the engine operating conditions to introduce the air from said on-off valve to one of the upstream portion and the downstream portion of said throttle valve.

4. A system according to claim 3, wherein said means for detecting the engine operating conditions includes a pressure sensor for detecting the pressure at the downstream portion of said throttle valve, and said data processing unit controls said change-over valve to introduce the air from said on-off valve to the upstream portion of said throttle valve when the pressure at the downstream portion of said throttle valve is lower than a predetermined pressure associated with a predetermined desired engine output and to introduce the air from said on-off valve to the downstream portion of said throttle valve at the downstream portion of the throttle valve when said pressure is higher than said predetermined pressure.

5. A system according to claim 3 or 4, wherein said on-off valve is an electromagnetic valve, and said change-over valve is a three-way valve.

6. A system according to claim 4, wherein said means for detecting the engine operating conditions further includes an engine rotational angle sensor.

7. A system according to claim 6, wherein said computer computes the fuel injection time of said fuel injector from an air flow rate based on said output of said air flowmeter, an engine speed based on the output of said rotational angle sensor and an intake pipe pressure based on the output of said pressure sensor, controls said change-over valve on the basis of comparison between said intake pipe pressure and said predetermined pressure, reads out a correction value of the fuel injection time corresponding to the engine speed and the intake pipe pressure, said correction value being stored in a memory unit of said computer, thereby to compute a correction of the fuel injection time, controls the fuel injection of said fuel injector in accordance with the fuel injection time thus corrected, controls said on-off valve to one of on and off states alternately for every predetermined number of fuel injections, compares the engine speeds for the open and closed states of said on-off valve upon each completion of said predetermined number of fuel injections, and corrects and stores said correction value of the fuel injection time on the basis of the result of said comparison.

8. A system according to claim 7, further comprising a throttle sensor, said computer determining whether said engine is idling from the output of said throttle sensor and changing said correction value of the fuel injection time in accordance with the result of said decision.

9. A system for controlling the air-fuel ratio, comprising:
 an air intake pipe for introducing the air into an engine and having a part thereof formed with a venturi of a carburetor,
 a fuel reservoir,
 an air bleed chamber for mixing the fuel from said fuel reservoir with air, the mixed fuel being introduced to said venturi through a nozzle,
 an electromagnetic valve for introducing the air to said air bleed chamber,
 a throttle valve provided at the downstream portion of said venturi,
 a bypass for applying the air in said air intake pipe from the upstream portion to the downstream portion of said venturi, said bypass including an on-off valve for controlling the air in said bypass and a change-over valve for introducing the air from said on-off valve to one of the upstream portion and the downstream portion of said throttle valve,
 means for detecting the operating conditions of the engine,
 and a computer for controlling said electromagnetic valve in response to the output of said means for detecting the engine conditions thereby to control the amount of air introduced to said air bleed chamber, said computer including turning on and off said on-off valve for each predetermined number of fuel injections thereby to change the air-fuel ratio alternately to the slightly richer and leaner sides of a basic air-fuel ratio, detecting the change of the output condition of said engine in accordance with the change of the air-fuel ratio, determining the direction of change of the optimum air-fuel ratio from the result of said detection, controlling the air-fuel ratio in the direction based on the result of said determination, and controlling said change-over valve in accordance with the engine operating conditions to introduce the air from said on-off valve to one of the upstream portion and the downstream portion of said throttle valve.

10. A system according to claim 9, wherein said means for detecting the engine operating conditions includes a pressure sensor for detecting the pressure at the downstream portion of said throttle valve, and said computer controls said change-over valve to introduce the air from said on-off valve to the upstream portion of said throttle valve when the pressure at the downstream portion of said throttle valve is lower than a value associated with a predetermined desired engine output and to introduce the air from said on-off valve to the downstream portion of said throttle valve when said pressure at the downstream portion of said throttle valve is higher than said value.

11. A system according to claim 9 or 10, wherein said on-off valve is a second electromagnetic valve and said change-over valve is a three-way valve.

* * * * *